(12) United States Patent
Yonishi

(10) Patent No.: US 8,851,685 B2
(45) Date of Patent: Oct. 7, 2014

(54) IMAGE DISPLAY APPARATUS FOR DISPLAYING GUI IMAGE AND METHOD FOR CONTROLLING THE SAME

(75) Inventor: Osamu Yonishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 13/524,723

(22) Filed: Jun. 15, 2012

(65) Prior Publication Data

US 2012/0249501 A1  Oct. 4, 2012

Related U.S. Application Data

(63) Continuation of application No. 12/784,114, filed on May 20, 2010, now Pat. No. 8,220,936.

(30) Foreign Application Priority Data

Jul. 7, 2009 (JP) ................................. 2009-161237

(51) Int. Cl.
  *G06F 3/01* (2006.01)

(52) U.S. Cl.
  USPC .......................................... 353/122; 345/173

(58) Field of Classification Search
  CPC ............ G06F 3/01; G06F 3/017; G06F 3/011
  USPC ........... 353/69, 70, 121, 122, 30, 85, 97, 101; 345/173
  See application file for complete search history.

(56) References Cited

U.S. PATENT DOCUMENTS

| | | | |
|---|---|---|---|
| 6,339,748 B1 * | 1/2002 | Hiramatsu | 702/159 |
| 6,359,612 B1 * | 3/2002 | Peter et al. | 345/156 |
| 6,414,672 B2 * | 7/2002 | Rekimoto et al. | 345/173 |
| 6,592,228 B1 * | 7/2003 | Kawashima et al. | 353/101 |
| 6,802,611 B2 * | 10/2004 | Chu et al. | 353/28 |
| 7,034,807 B2 * | 4/2006 | Maggioni | 345/173 |

(Continued)

FOREIGN PATENT DOCUMENTS

| | | |
|---|---|---|
| JP | 2007-057961 A | 3/2007 |
| JP | 2008-203490 A | 9/2008 |

OTHER PUBLICATIONS

The above references were cited in a Sep. 6, 2013 Japanese Office Action, a copy of which is enclosed without an English Translation, that issued in Japanese Patent Application No. 2009-161237.

*Primary Examiner* — Francis M Legasse, Jr.
*Assistant Examiner* — Bao-Luan Le
(74) *Attorney, Agent, or Firm* — Cowan, Liebowitz & Latman, P.C.

(57) ABSTRACT

There is provided an image projection apparatus comprising: a measuring unit that measures a distance from the image projection apparatus to a projection surface; a generating unit that generates a first operation image if the measured distance is less than a threshold value and generates a second operation image if the measured distance is not less than the threshold value, wherein the first operation image is an image with respect to which an operation can be input by pointing on the first operation image that is being projected with a body part of a user, and the second operation image is an image with respect to which an operation can be input by operating a cursor displayed in the second operation image that is being projected using a predetermined operating unit; and a projecting unit that projects an operation image generated by the generating unit onto the projection surface.

18 Claims, 8 Drawing Sheets

(56) References Cited

U.S. PATENT DOCUMENTS

| | | | |
|---|---|---|---|
| 7,138,983 B2 * | 11/2006 | Wakai et al. | 345/173 |
| 7,230,611 B2 * | 6/2007 | Bischoff | 345/175 |
| 7,259,747 B2 * | 8/2007 | Bell | 345/156 |
| 7,834,846 B1 * | 11/2010 | Bell | 345/156 |
| 2001/0012001 A1 * | 8/2001 | Rekimoto et al. | 345/173 |
| 2002/0093666 A1 * | 7/2002 | Foote et al. | 356/621 |
| 2002/0186221 A1 * | 12/2002 | Bell | 345/474 |
| 2004/0046736 A1 * | 3/2004 | Pryor et al. | 345/156 |
| 2004/0183775 A1 * | 9/2004 | Bell | 345/156 |
| 2007/0058136 A1 * | 3/2007 | Sakai | 353/34 |
| 2008/0062123 A1 * | 3/2008 | Bell | 345/156 |

* cited by examiner

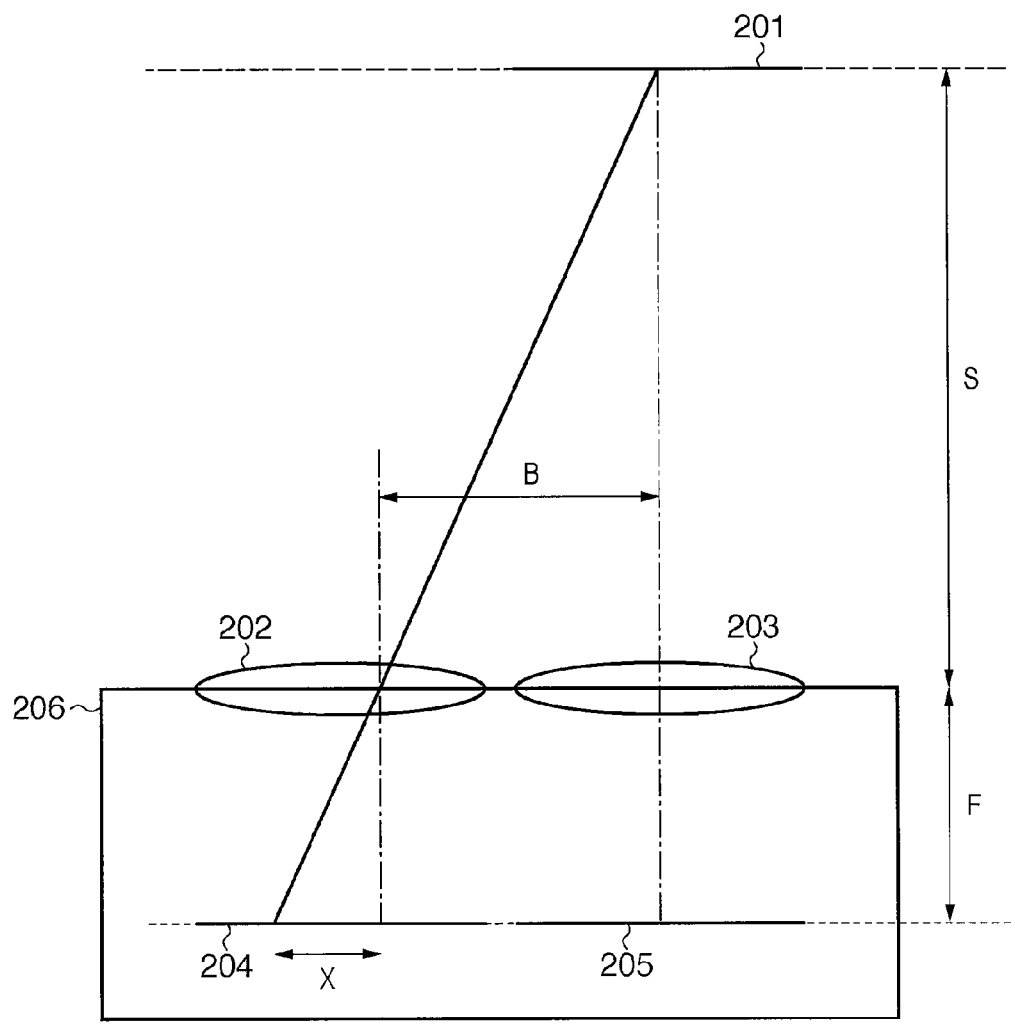

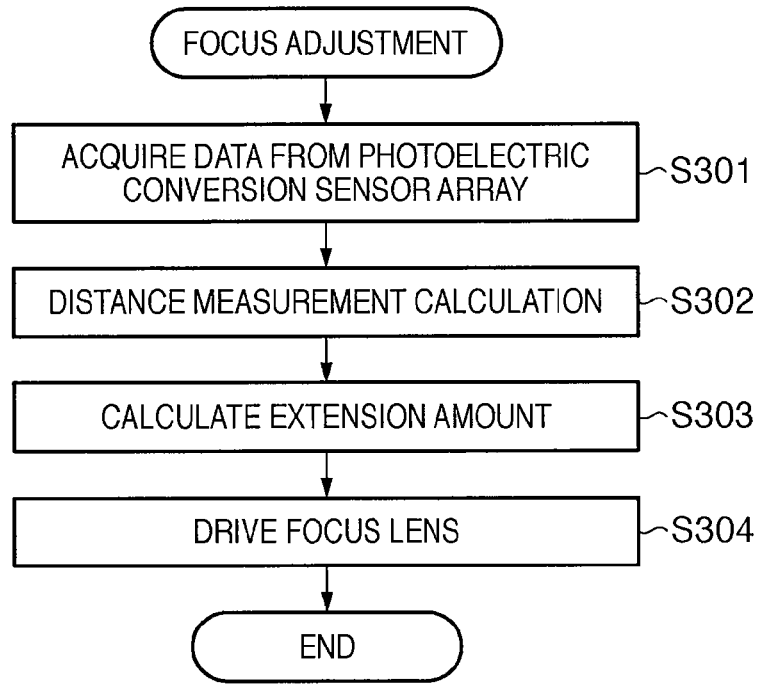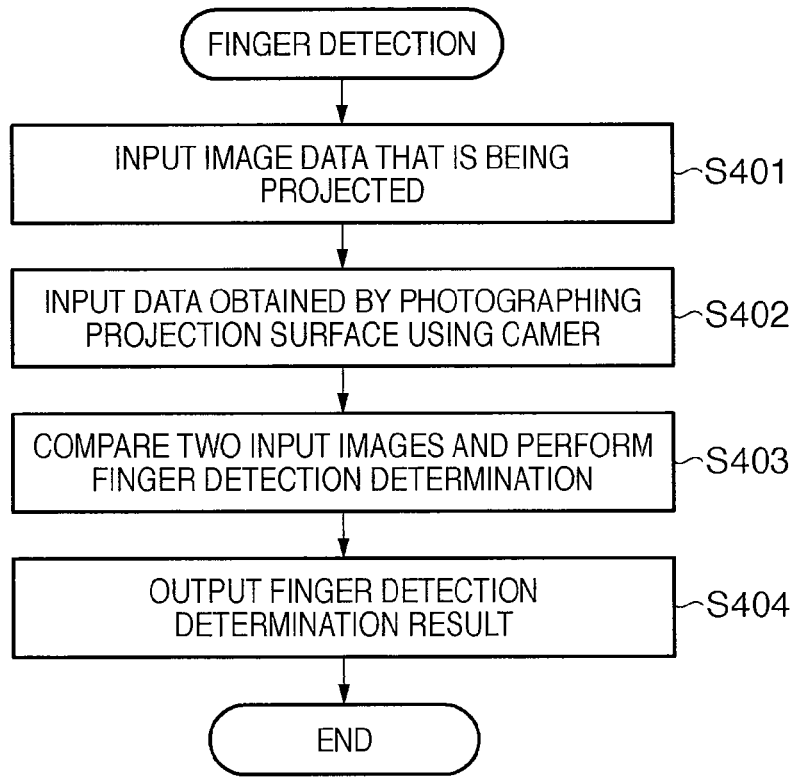

IMAGE DISPLAY APPARATUS FOR DISPLAYING GUI IMAGE AND METHOD FOR CONTROLLING THE SAME

CROSS-REFERENCE TO RELATED APPLICATION

This application is a continuation of application Ser. No. 12/784,114, filed May 20, 2010, the entire disclosure of which is hereby incorporated by reference.

BACKGROUND OF THE INVENTION

1. Field of the Invention

The present invention relates to an image projection apparatus and a method for controlling the image projection apparatus.

2. Description of the Related Art

Currently, a projector (an image projection apparatus) for projecting an image onto a projection surface such as a desk or a wall is known (Japanese Patent Laid-Open No. 2005-236746). Moreover, a technique that makes it possible to indicate a desired area of a projected image with a finger or the like is known (Japanese Patent Laid-Open No. 2008-152622). According to Japanese Patent Laid-Open Nos. 2005-236746 and 2008-152622, the projector does not take the distance to the projection surface into account when generating an image to be projected.

If the distance from a projector to a projection surface changes, the size of an image on the projection surface also changes. Moreover, in the case where, for example, a user holds the projector by hand, the distance from the user to the projection surface also changes with the change in the distance from the projector to the projection surface. Therefore, the type of projection image convenient for the user changes depending on the distance from the projector to the projection surface. However, according to Japanese Patent Laid-Open Nos. 2005-236746 and 2008-152622, the distance to the projection surface is not taken into account when the projector generates a projection image.

SUMMARY OF THE INVENTION

The present invention has been made in view of the above circumstances, and it is a feature thereof to provide an image projection apparatus for projecting an image that has been generated with the distance to the projection surface being taken into account and a method for controlling the image projection apparatus.

According to an aspect of the present invention, there is provided an image display apparatus comprising: an image display unit that displays a GUI image on a display surface; and a control unit that controls the image display unit, in response to redetermined signal, to display a first GUI image or a second GUI image.

According to another aspect of the present invention, there is provided a method for controlling an image display apparatus, comprising: an image display step of displaying a GUI image on a display surface; and a control step of controlling the image display step, in response to predetermined signal, to display a first GUI image or a second GUI image.

With the foregoing configurations, the present invention can provide an image projection apparatus for projecting an image that has been generated with the distance to the projection surface being taken into account and a method for controlling the image projection apparatus.

Further features of the present invention will become apparent from the following description of exemplary embodiments with reference to the attached drawings.

BRIEF DESCRIPTION OF THE DRAWINGS

FIG. 2 is a diagram showing the principle of an external triangulation distance measuring method for obtaining the distance from a projector to a projection surface.

FIG. 3 is a flowchart illustrating the flow of a focus adjustment process performed by the projector shown in FIG. 1.

FIG. 4 is a flowchart illustrating the flow of a finger detection process performed by the projector shown in FIG. 1.

DESCRIPTION OF THE EMBODIMENTS

Embodiments of the present invention will now be described with reference to the attached drawings. It should be noted that the technical scope of the present invention is defined by claims, and is not limited by each embodiment described below. In addition, not all combinations of the features described in the embodiments are necessarily required for realizing the present invention.

Figure 1:
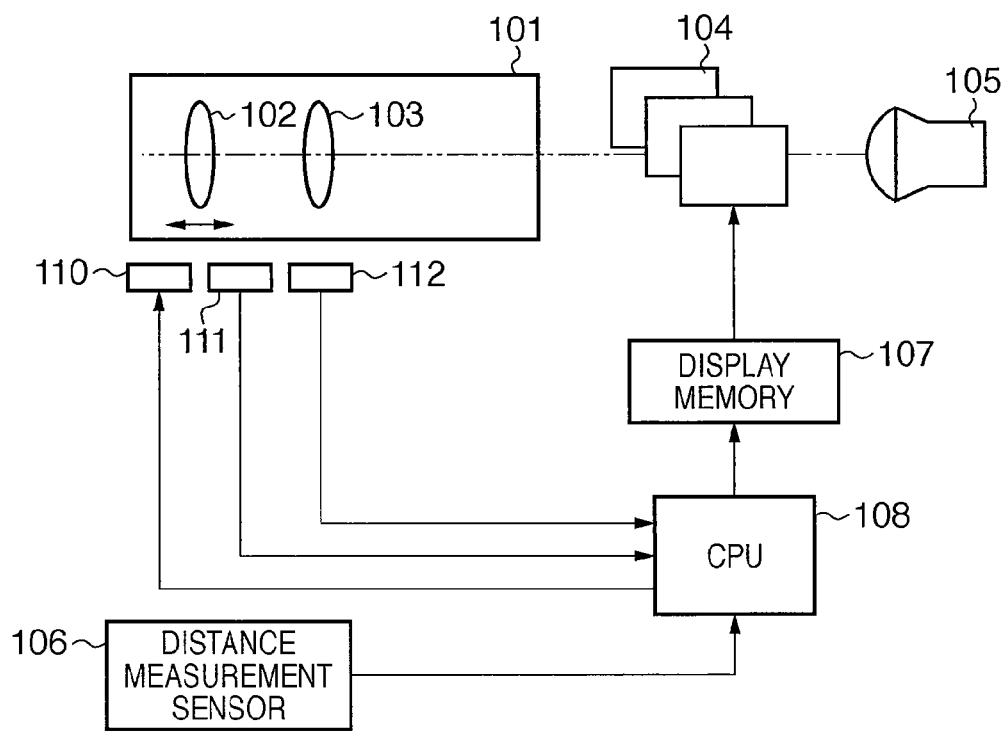
FIG. 1 is a block diagram showing a basic configuration of a projector.

First, a basic configuration of a projector (an image projection apparatus) will be described with reference to FIGS. 1 to 4. FIG. 1 is a block diagram showing a basic configuration of a projector. A CPU 108 creates display data (an image for projection) on a display memory 107. The display data is supplied to a liquid crystal panel 104 from the display memory 107 and displayed on the liquid crystal panel 104. A lamp 105 is disposed behind the liquid crystal panel 104. When the lamp 105 irradiates the liquid crystal panel 104, the image displayed on the liquid crystal panel 104 is projected onto a projection surface (a screen) through an optical system 101 disposed in front of the liquid crystal panel 104.

The optical system 101 includes a focus lens 102 for adjusting the focus of an image to be projected (projection image) and a zoom lens 103 for scaling the image to be projected. Position information of the focus lens 102 is detected using a focus encoder 111, and zoom information of the zoom lens 103 is detected using a zoom encoder 112. A motor 110 drives the focus lens 102 in an optical axis direction.

The distance from the projector to the projection surface is calculated using phase difference information obtained from image information (light intensity distribution) of a subject (detection target) detected by a distance measurement sensor 106. The CPU 108 calculates a driving target position (focusing position) of the focus lens 102 at which the projection image can be focused based on this phase difference information. The CPU 108 further obtains a driving amount of the motor 110 using this driving target position and the position information detected by the focus encoder 111 and transmits the result to the motor 110. The motor 110 drives the focus lens 102 to the focusing position according to the driving amount.

FIG. 2 is a diagram showing the principle of an external triangulation distance measuring method for obtaining the distance from a projector to a projection surface. 201 indicates a projection surface onto which an image is projected, and 204 and 205 each indicate a photoelectric conversion sensor array in which a plurality of photoelectric conversion sensors are arranged side by side. The photoelectric conversion sensor arrays 204 and 205 are, for example, area sensors or line sensors, such as CCDs.

Focus sensor lenses 202 and 203 are disposed in front of the photoelectric conversion sensor arrays 204 and 205, respectively. An image of the detection target projected onto the projection surface 201 passes through each detection optical path and is detected by the photoelectric conversion sensor array 204 or 205 via the focus sensor lens 202 or 203. Here, the focus sensor lenses 202 and 203 and the photoelectric conversion sensor arrays 204 and 205 are collectively called a focus sensor unit 206. The focus sensor unit 206 corresponds to the distance measurement sensor 106 in FIG. 1.

The distance S from the focus sensor unit 206 to the projection surface 201 can be obtained using the following formula:

$$S = B \times F / X$$

where the baseline length of the focus sensor unit 206 is B, the focal length is F, and the phase difference of the photoelectric conversion sensor array 204 relative to the photoelectric conversion sensor array 205 is X.

FIG. 3 is a flowchart illustrating the flow of a focus adjustment process performed by the projector shown in FIG. 1.

In step S301, the CPU 108 reads output signals resulting from images of the detection target formed on the photoelectric conversion sensor arrays 204 and 205 and obtains light intensity distributions on the respective photoelectric conversion sensor arrays 204 and 205 based on the output signals. The obtained light intensity distributions are stored in a storage unit within the CPU 108.

In step S302, the CPU 108 obtains a phase difference from the light intensity distributions of the photoelectric conversion sensor arrays 204 and 205. An example of the method for obtaining the phase difference is a method of calculating an evaluation value for evaluating the similarity between the light intensity distributions of the photoelectric conversion sensor arrays 204 and 205 by correlation calculation and obtaining the phase difference from the relationship between the evaluation value and a shift between the images detected by the photoelectric conversion sensor arrays 204 and 205. Next, the CPU 108 obtains the distance to the projection surface 201 based on the external triangulation distance measuring method.

In step S303, the CPU 108 calculates an extension amount that the focus lens 102 has to move to reach the focusing position, based on the distance obtained in step S302. An extension amount D of the focus lens 102 from the position thereof at the time when projecting an image at infinity is calculated using the following formula:

$$D = 1/(1/F - 1/S) - F$$

where the distance to the projection surface 201 is S and the focal length of the focus lens 102 is F.

Next, indication of a projected image with a finger will be described. FIG. 4 is a flowchart illustrating the flow of a finger detection process performed by the projector shown in FIG. 1.

In step S401, the CPU 108 acquires image data being projected from the projector. In step S402, the CPU 108 acquires image data of the projection surface 201 taken by a camera (not shown). In step S403, the CPU 108 compares the image data acquired in step S401 and the image data acquired in step S402 and performs a finger detection (including detection of a fingertip position) process (with respect to the finger detection process, a technique described in Japanese Patent Laid-Open No. 2008-152622 etc. can be used). In step S404, the CPU 108 outputs the result of the detection in step S403.

First Embodiment

Figure 5:
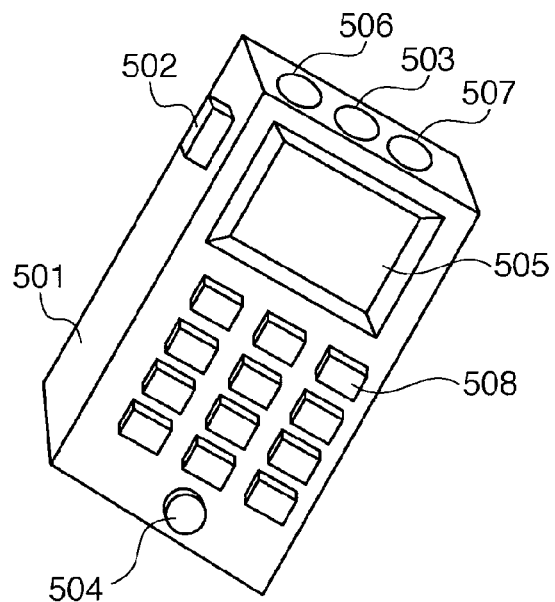
FIG. 5 is a diagram showing an outer appearance of a mobile telephone 501 according to a first embodiment.

An embodiment in which the image projection apparatus of the present invention is applied to a mobile telephone will be described. FIG. 5 is a diagram showing an outer appearance of a mobile telephone 501 according to a first embodiment. The mobile telephone 501 includes a projector unit 503. The mobile telephone 501 also includes a projector button 504 and a focus adjustment button 502 in addition to operation buttons 508 used for common telephone operations. The projector button 504 is a button for turning on/off the projector unit 503. The focus adjustment button 502 is a button used for an operation for performing focus adjustment of a projected image. The mobile telephone 501 also includes a distance measurement sensor 506 for measuring the distance to a projection surface and a camera 507 for use for the finger detection process.

Figure 6:
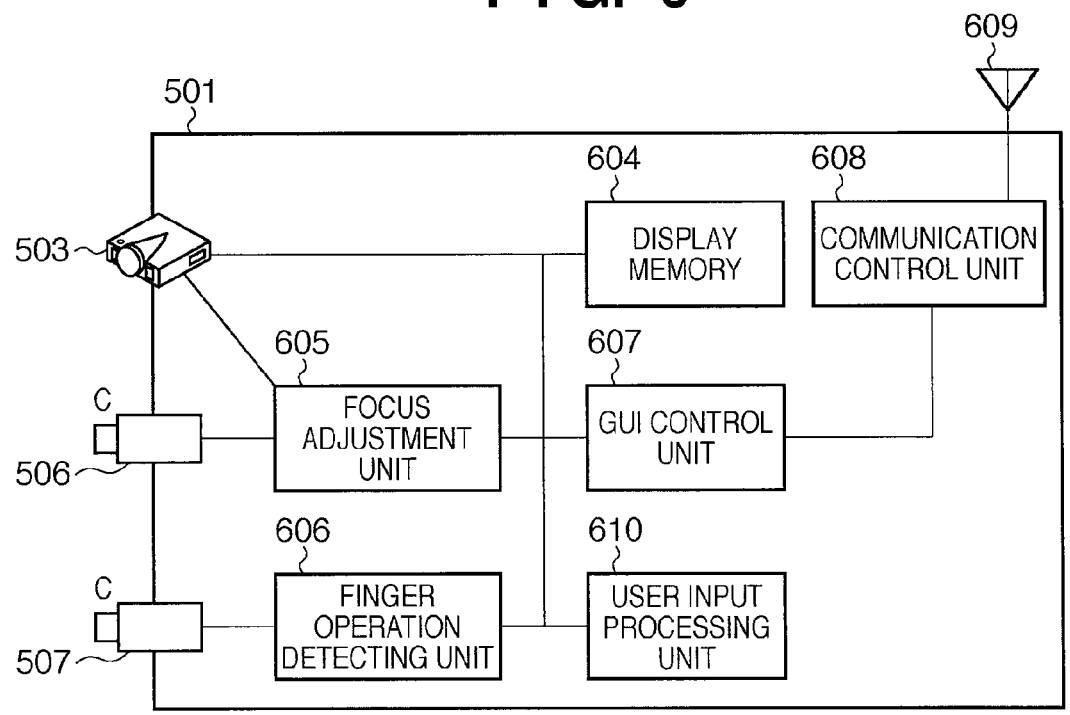
FIG. 6 is a functional block diagram showing the configuration of the mobile telephone 501.

FIG. 6 is a functional block diagram showing the configuration of the mobile telephone 501. In FIG. 6, the same elements as the elements shown in FIG. 5 are denoted by the same reference numerals, and descriptions thereof will be omitted. A focus adjustment unit 605 adjusts the focus by controlling the projector unit 503 using an input from the distance measurement sensor 506. A finger operation detecting unit 606 (an area detecting unit) performs a process (finger detection process) for detecting an area, of an image on the projection surface, indicated by a finger on the projection surface by comparing an image taken by the camera 507 with an image projected by the projector unit 503. It should be noted that the detection target is not limited to a finger and may be, for example, an object such as a pointing rod. A user input processing unit 610 accepts a button operation on the focus adjustment button 502, the projector button 504, or the like and performs processing corresponding to the operated button.

A GUI control unit 607 generates an image (image for projection) to be projected by the projector unit 503. A display memory 604 stores the image for projection generated by the GUI control unit 607. A communication control unit 608 performs speech communication, data communication, or other communication via an antenna 609.

Figure 7:
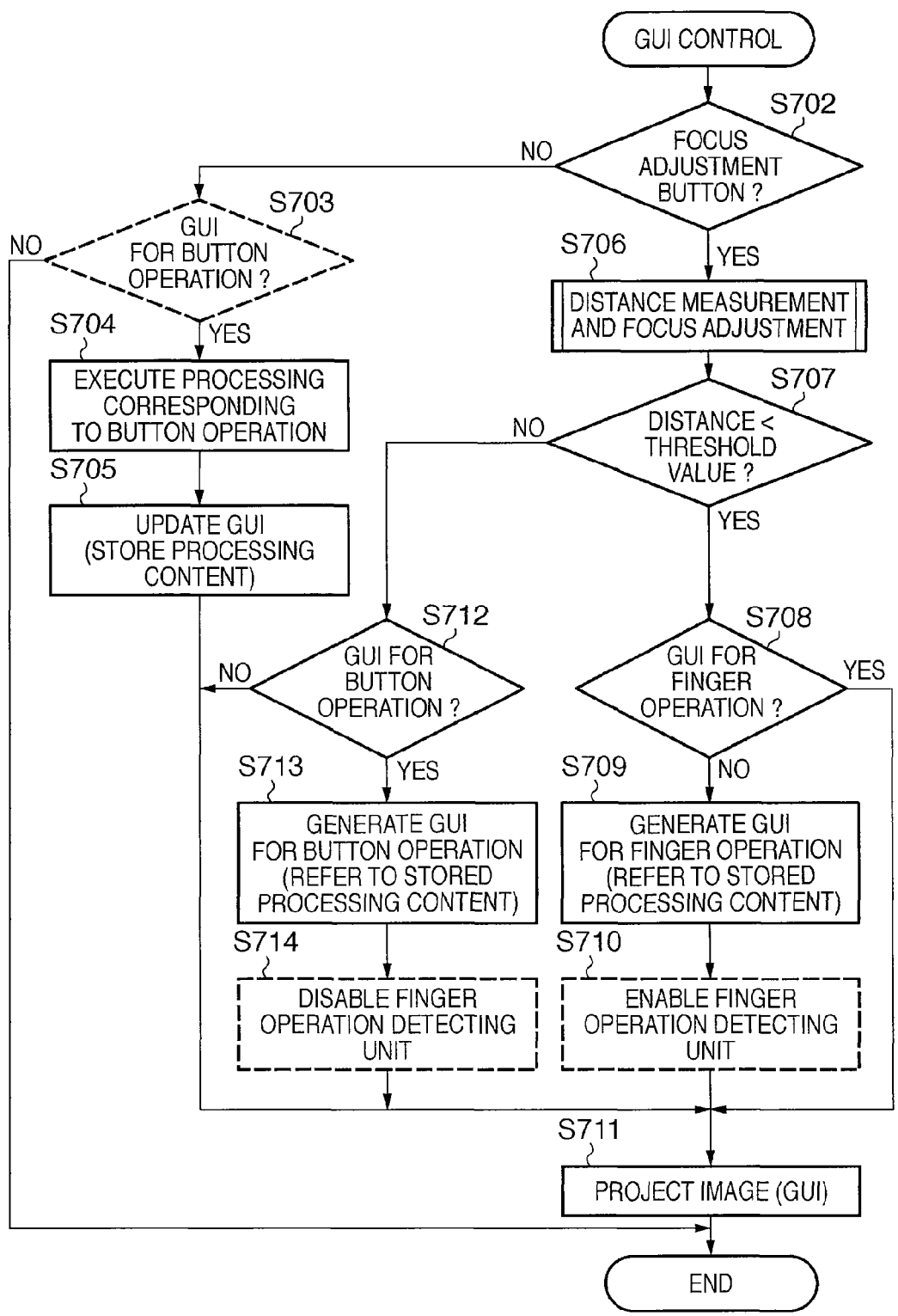
FIG. 7 is a flowchart illustrating the flow of an image projection process executed by the mobile telephone 501.

FIG. 7 is a flowchart illustrating the flow of an image projection process executed by the mobile telephone 501. In FIG. 7, processing at steps S703, S710, and S714, which are enclosed by the dashed lines, can be omitted (the details will be described later). If the projector button 504 is pressed, the projector unit 503 is activated, and if a button operation is performed when the projector unit 503 is operating, the process of this flowchart is started. Moreover, even if the button operation is not performed, the process of this flowchart may be started from step S706 when, for example, the projector unit 503 is activated.

In step S702, the user input processing unit 610 determines whether or not the operated button is the focus adjustment button 502. If the determination result is "Yes", the process proceeds to step S706, and if the determination result is "No", the process proceeds to step S703.

In step S706, the focus adjustment unit 605 measures the distance to the projection surface using the distance measurement sensor 506 and performs focus adjustment (see FIG. 3 and the description thereof for details). In step S707, the GUI control unit 607 determines whether or not the measured distance is less than a threshold value. If the measured distance is less than the threshold value, the process proceeds to step S708, and if not, the process proceeds to step S712. This threshold value is used as a benchmark for determining whether or not the user can reach the projection surface. That is to say, if the distance to the projection surface is less than the threshold value, there is a good possibility that the user can reach the projection surface, and accordingly, a GUI for finger operation is projected as will be described later. The threshold value is, for example, 70 cm, but the mobile telephone 501 may be configured so as to allow the user to set the threshold value.

In step S708, the GUI control unit 607 determines whether or not the projector unit 503 is projecting a GUI for finger operation (a first image). If the determination result is "Yes", the process proceeds to step S711, and if the determination result is "No", the process proceeds to step S709.

In step S709, the GUI control unit 607 generates a GUI for finger operation as an image for projection and stores the GUI in the display memory 604. In step S710, the GUI control unit 607 enables the finger operation detecting unit 606.

Figure 8:
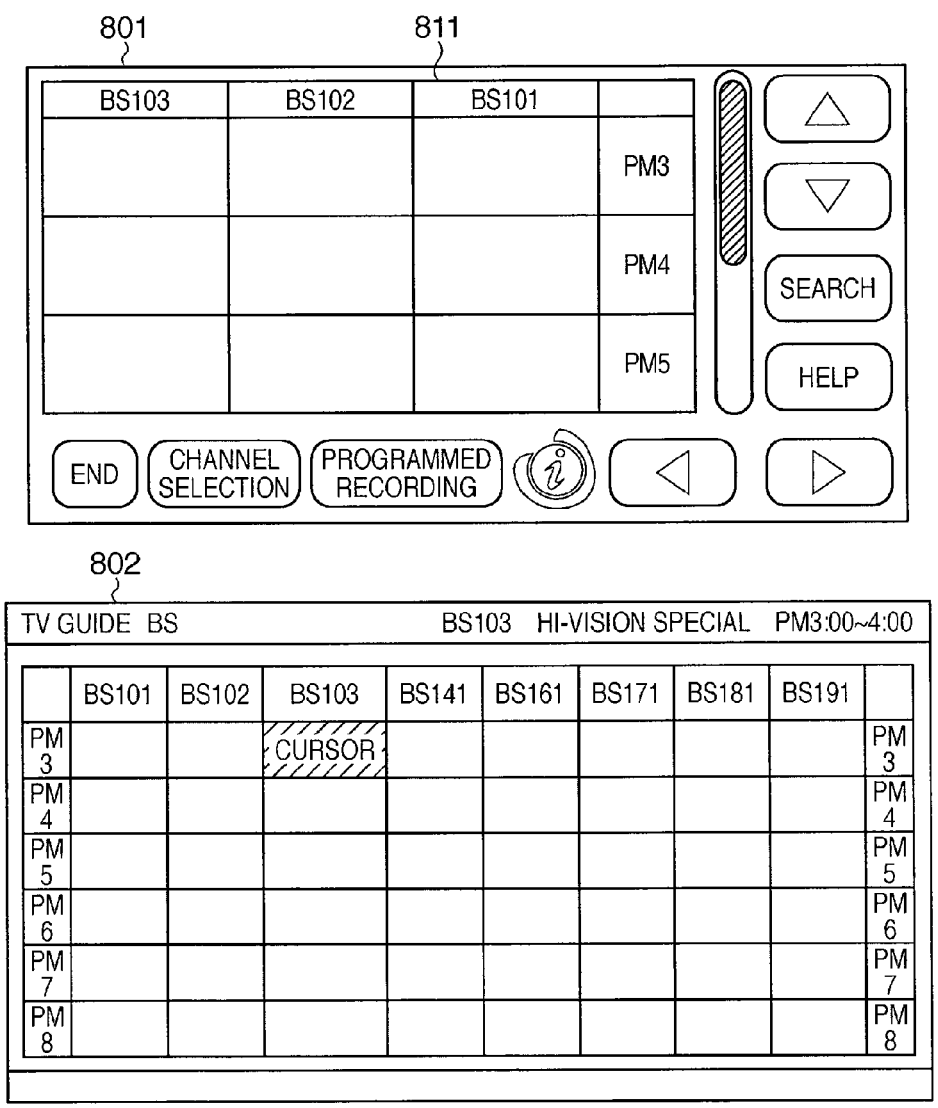
FIG. 8 is a diagram showing an example of a GUI for finger operation and a GUI for button operation.

A GUI for finger operation 801 in FIG. 8 is an example of the GUI for finger operation generated in step S709. If the distance to the projection surface is small, the size of an image that appears on the projection surface is relatively small, and accordingly, areas of an "End" button and the like are generated so as to be relatively large in order to improve the visibility and operability. Although not shown in FIG. 7, the finger operation detecting unit 606 detects an area indicated by a finger in the manner illustrated in FIG. 4, and the user input processing unit 610 executes processing corresponding to the detected area (e.g., scrolling of a TV guide 811). Moreover, the GUI control unit 607 generates an updated GUI for finger operation based on the processing content that the user input processing unit 610 has executed.

In step S711, the projector unit 503 projects an image for projection (a GUI for finger operation if step S709 has been performed) stored in the display memory 604.

If it is determined in step S707 that the distance is not less than the threshold value, in step S712, the GUI control unit 607 determines whether or not the projector unit 503 is projecting a GUI for button operation (a second image). If the determination result is "Yes", the process proceeds to step S711, and if the determination result is "No", the process proceeds to step S713.

In step S713, the GUI control unit 607 generates a GUI for button operation as an image for projection and stores the GUI in the display memory 604. In step S714, the GUI control unit 607 disables the finger operation detecting unit 606. A GUI for button operation 802 in FIG. 8 is an example of the GUI for button operation generated in step S713. The GUI for button operation 802 has a cursor that moves in response to an operation on a button such as the operation buttons 508. Moreover, if the distance to the projection surface is large, the size of an image that appears on the projection surface is relatively large, and accordingly, the GUI for button operation 802 generally contains more information than the GUI for finger operation 801.

If it is determined in step S702 that a button other than the focus adjustment button 502 has been operated, in step S703, the user input processing unit 610 determines whether or not the projector unit 503 is projecting a GUI for button operation. If the determination result is "Yes", the process proceeds to step S704, and if the determination result is "No", the process is ended.

In step S704, the user input processing unit 610 executes processing (e.g., moving the cursor) corresponding to the button operation. In step S705, the GUI control unit 607 generates an updated GUI for button operation based on the processing content that has been executed in S704.

Incidentally, in step S705, the GUI control unit 607 may store the processing content that the user input processing unit 610 has executed (i.e., the state of the updated GUI for button operation). Similarly, the GUI control unit 607 may also store the processing content that the user input processing unit 610 has executed during projection of the GUI for finger operation. In this case, in step S709, the GUI control unit 607 can generate a GUI for finger operation based on the processing content that has been executed during projection of the GUI for button operation. Also, in step S713, the GUI control unit 607 can generate a GUI for button operation based on the processing content that has been executed during projection of the GUI for finger operation.

Thus, if the type of GUI is switched, the continuity of the GUI content between before and after the switching can be maintained. For example, in the GUI for button operation 802 in FIG. 8, the cursor is located in the "PM3" row, under the "BS103" column. Then, if switching occurs in this state, a GUI for finger operation is generated so that, as shown in the GUI for finger operation 801, the "PM3" row appears at the top and the "BS103" column appears at the left.

Moreover, although the finger operation detecting unit 606 is enabled in step S710 and the finger operation detecting unit 606 is disabled in step S714, the finger operation detecting unit 606 may be always operative. That is to say, the mobile telephone 501 may accept an operation by a finger even when a GUI for button operation is being projected. Similarly, the mobile telephone 501 may accept an operation through a button even when a GUI for finger operation is being projected. In this case, the determination in step S703 is no longer necessary, and if it is determined "NO" in step S702, the process proceeds to step S704.

As described above, according to this embodiment, the mobile telephone 501 projects an image with the distance to a projection surface being taken into account, and thus, the convenience for the user is improved. In particular, when the user performs an operation with respect to an image projected from the image projection apparatus, the image that is easy to operate is different between the cases where the image is projected at a position close to the user and where the image is projected at a distant position as compared to the former case, that is to say, depending on the distance to the projection surface. As described above, it is convenient that, in the case where the image is projected at the close position, the user inputs an operation with respect to the image using a finger, and in the case where the image is projected at a position beyond the reach of the finger, an operation with respect to the image is input using some kind of pointing device. Conventional techniques have not been able to solve such a problem, but the present invention employs the above-described configuration and therefore can solve the problem by generating and displaying an image corresponding to the distance to the projection surface when an operation is input using an image projected from the image projection apparatus.

First Variation

Figure 9:
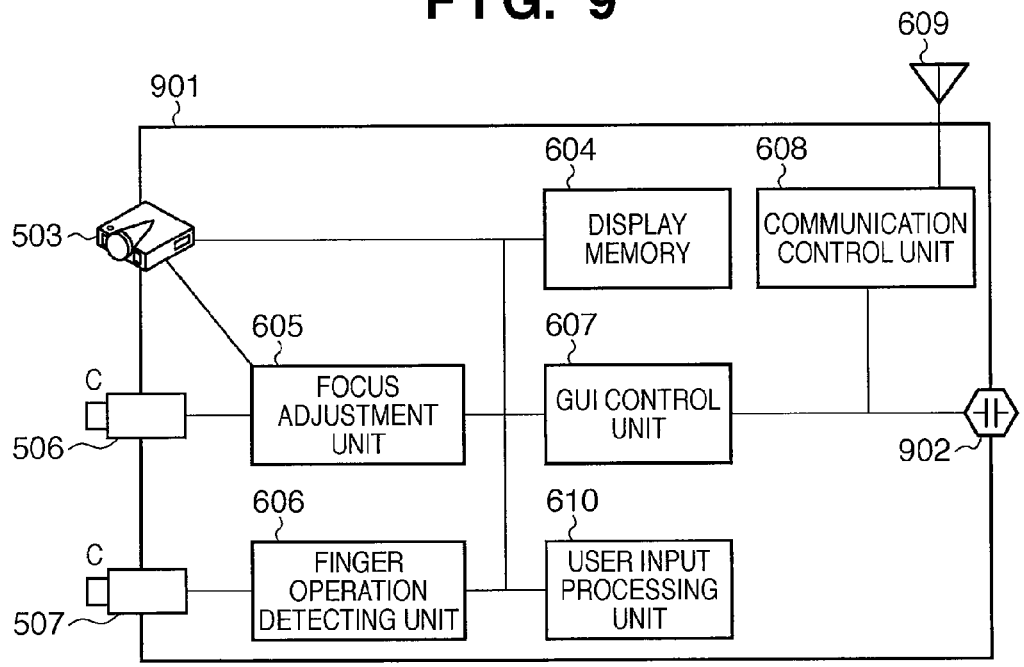
FIG. 9 is a functional block diagram showing the configuration of a mobile telephone 901 according to a first variation of the first embodiment.

FIG. 9 is a functional block diagram showing the configuration of a mobile telephone 901 according to a first variation of the first embodiment. In FIG. 9, the same elements as the elements shown in FIG. 6 are denoted by the same reference numerals, and descriptions thereof will be omitted. The mobile telephone 901 includes a hand sensor 902. The hand sensor 902 determines whether the user is holding the mobile telephone 901 with the right hand or the left hand.

In the first variation, in the above-described image projection process, the GUI control unit 607 takes into account which hand the user is holding the mobile telephone 901 with when generating a GUI for finger operation, as described below with reference to FIG. 10.

Figure 10:
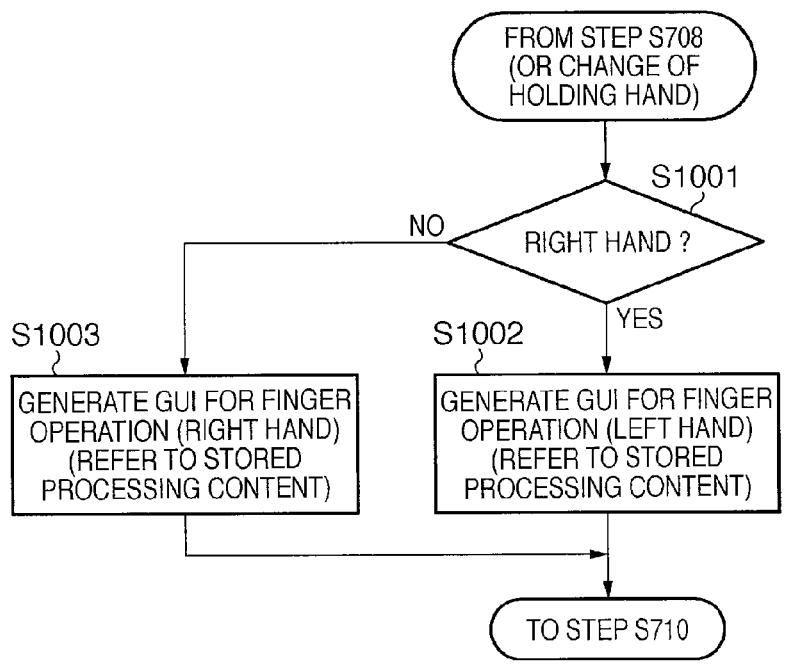
FIG. 10 is a diagram illustrating processing that replaces the processing at step S709 shown in FIG. 7.

FIG. 10 is a diagram illustrating processing that replaces the processing at step S709 shown in FIG. 7. Moreover, the processing in FIG. 10 is also executed when the hand sensor 902 detects that the hand that holds the mobile telephone 901 has changed during projection of a GUI for finger operation.

Figure 11:
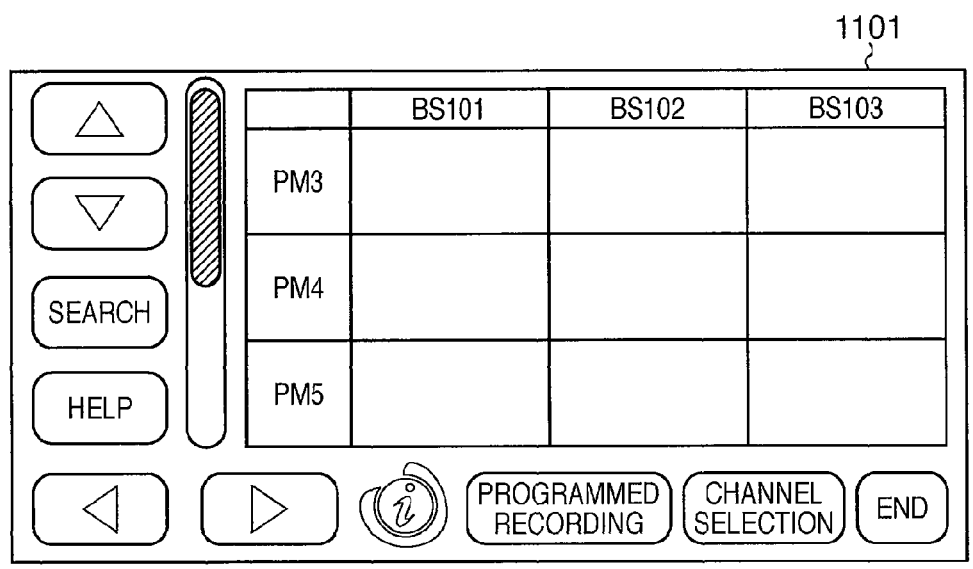
FIG. 11 is a diagram showing an example of a GUI for finger operation (for operation with the left hand).

In step S1001, the GUI control unit 607 determines whether or not the hand that holds the mobile telephone 901 is the right hand. If it is the right hand, the process proceeds to step S1002, and if not, the process proceeds to step S1003. In step S1002, the GUI control unit 607 generates a GUI for finger operation 1101 shown in FIG. 11. The GUI for finger operation 1101 is configured so as to be appropriate for operation with the left hand. In step S1003, the GUI control unit 607 generates the GUI for finger operation 801 shown in FIG. 8. The GUI for finger operation 801 is configured so as to be appropriate for operation with the right hand. Thus, the convenience for the user is further improved.

Second Variation

Figure 12:
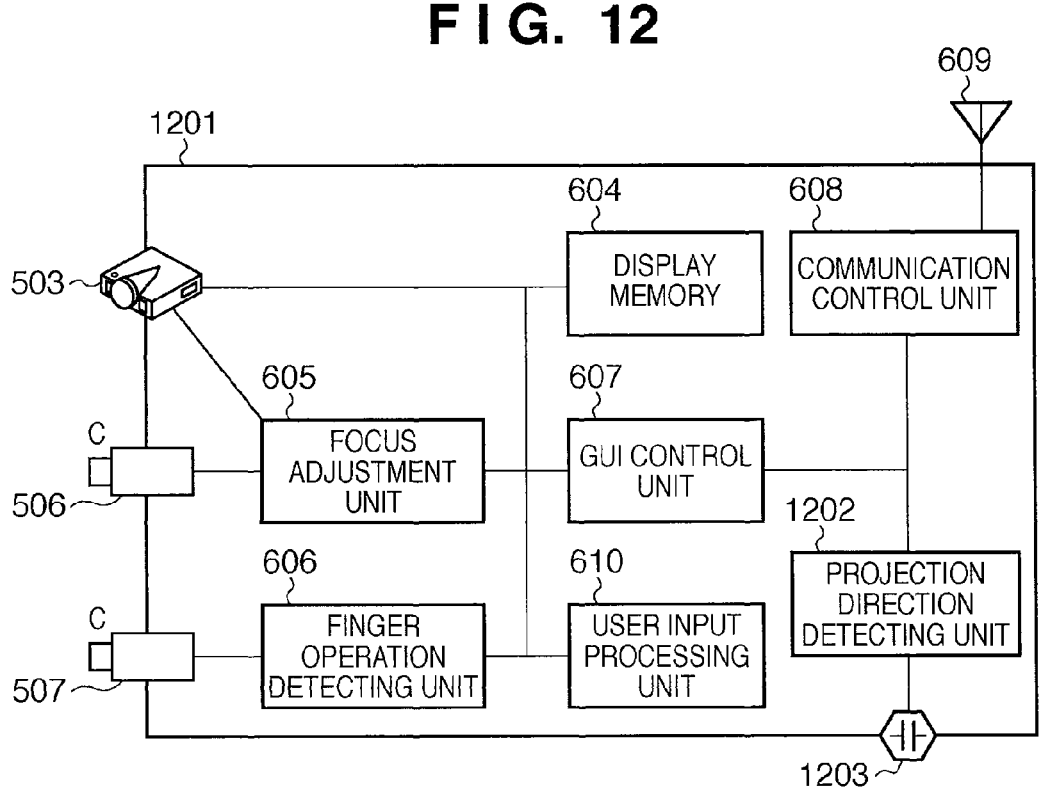
FIG. 12 is a functional block diagram showing the configuration of a mobile telephone 1201 according to a second variation of the first embodiment.

FIG. 12 is a functional block diagram showing the configuration of a mobile telephone 1201 according to a second variation of the first embodiment. In FIG. 12, the same elements as the elements shown in FIG. 6 are denoted by the same reference numerals, and descriptions thereof will be omitted. The mobile telephone 1201 includes a projection direction detecting unit 1202 (a movement detecting unit) and an acceleration sensor 1203. The projection direction detecting unit 1202 detects movement of the mobile telephone 1201 based on information from the acceleration sensor 1203.

If the projection direction detecting unit 1202 detects movement, the image projection process illustrated in FIG. 7 is started from step S706. Although the distance to the projection surface can change with movement of the mobile telephone 1201, according to the second variation, an image corresponding to the distance after the change is projected, and thus, the convenience for the user is further improved.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-161237, filed on Jul. 7, 2009, which is hereby incorporated by reference herein in its entirety.

What is claimed is:

1. An image display apparatus comprising:
    an image display unit that displays a GUI on a display surface;
    a condition determination unit that determines condition of the image display apparatus; and
    a control unit that controls the image display unit, in response to a predetermined signal, to display a first GUI when the condition determination unit determines that the condition of the image display apparatus is a first condition and to display a second GUI when the condition determination unit determines that the condition of the image display apparatus is a second condition,
    wherein the first GUI is a GUI for finger operation performing on the display surface,
    wherein the second GUI is a GUI for button operation, and
    wherein the first GUI is different from the second GUI.

2. The image display apparatus according to claim 1, wherein the predetermined signal is a focus adjustment operation signal.

3. The image display apparatus according to claim 1, wherein the predetermined signal is a detection signal which indicates movement of the image display apparatus.

4. The image display apparatus according to claim 1, wherein the predetermined signal is an activation signal.

5. The image display apparatus according to claim 1, further comprising
    a communication unit.

6. The image display apparatus according to claim 1, further comprising
    a detection unit that detects an operation object.

7. The image display apparatus according to claim 1, further comprising
    a measurement unit that measures a distance between the display surface and the image display apparatus.

8. The image display apparatus according to claim 1, further comprising:
    a camera unit; and
    a measurement unit;
    wherein the image display unit, the camera unit, and the measurement unit are located in the same plane of the image display apparatus.

9. The image display apparatus according to claim 1, further comprising
    a detection unit that detects an operation object,
    wherein the control unit enables the detection unit when the image display unit is displaying the first GUI.

10. The image display apparatus according to claim 6, wherein the detection unit detects the operation object based on an image taken by a camera unit.

11. The image display apparatus according to claim 6, wherein the control unit controls the image display apparatus based on the detection result of the detection unit.

12. The image display apparatus according to claim 11, wherein when the first GUI is displayed by the image display unit, the control unit controls the image display apparatus based on the detection result of the detection unit.

13. The image display apparatus according to claim 11, wherein when the second GUI is displayed by the image display unit, the control unit does not control the image display apparatus based on the detection result of the detection unit.

14. The image display apparatus according to claim 11, wherein the control unit controls the image display apparatus based on a button operation.

15. The image display apparatus according to claim 14, wherein when the first GUI is displayed by the image display unit, the control unit does not control the image display apparatus based on a button operation.

16. The image display apparatus according to claim 14, wherein when the second GUI is displayed by the image display unit, the control unit controls the image display apparatus based on a button operation.

17. A method for controlling an image display apparatus, comprising:
an image display step of displaying a GUI on a display surface;
a condition determination step of determining condition of the image display apparatus; and
a control step of controlling the image display step, in response to a predetermined signal, to display a first GUI when the condition determination step determines that the condition of the image display apparatus is a first condition and to display a second GUI when the condition determination step determines that the condition of the image display apparatus is a second condition,
wherein the first GUI is a GUI for finger operation performing on the display surface,
wherein the second GUI is a GUI for button operation, and
wherein the first GUI is different from the second GUI.

18. A non-transitory computer-readable storage medium on which a control program for an image display apparatus having an image display unit is stored, wherein the control program is configured to:
control the image display unit to display a GUI on a display surface;
determine condition of the image display apparatus; and
control the image display unit, in response to a predetermined signal, to display a first GUI when it is determined that the condition of the image display apparatus is a first condition and to display a second GUI when it is determined that the condition of the image display apparatus is a second condition,
wherein the first GUI is a GUI for finger operation performing on the display surface,
wherein the second GUI is a GUI for button operation, and
wherein the first GUI is different from the second GUI.

* * * * *